United States Patent [19]

Nakatani et al.

[11] Patent Number: 5,276,902
[45] Date of Patent: Jan. 4, 1994

[54] MEMORY ACCESS SYSTEM FOR VECTOR DATA PROCESSED OR TO BE PROCESSED BY A VECTOR PROCESSOR

[75] Inventors: Shohji Nakatani; Nobuyuki Sugiura, both of Kawasaki; Ken Seki, Kunitachi, all of Japan

[73] Assignee: Fujitsu Limited, Kawasaki, Japan

[21] Appl. No.: 866,277

[22] Filed: Apr. 13, 1992

Related U.S. Application Data

[63] Continuation of Ser. No. 431,897, Nov. 6, 1989, abandoned.

[30] Foreign Application Priority Data

Nov. 7, 1988 [JP] Japan .................. 63-280997

[51] Int. Cl.$^5$ .................. G06F 15/16; G06F 3/00
[52] U.S. Cl. .................. 395/800; 395/200; 395/250; 395/725; 364/736; 364/232.21; 364/228.1; 364/DIG. 1; 364/DIG. 2
[58] Field of Search .............. 395/800, 725, 250, 200; 364/736, 736.5, 228.182, 242.6, 231.4, DIG. 1, DIG. 2

[56] References Cited

U.S. PATENT DOCUMENTS

| | | | |
|---|---|---|---|
| 4,556,939 | 12/1985 | Read | 395/325 |
| 4,706,191 | 11/1987 | Hamstra et al. | 395/250 |
| 4,849,882 | 7/1989 | Aoyama et al. | 395/800 |
| 4,888,682 | 11/1989 | Ngai et al. | 395/800 |
| 4,994,960 | 2/1991 | Tuchler et al. | 395/725 |
| 5,038,282 | 8/1991 | Gilbert et al. | 395/200 |
| 5,050,072 | 9/1991 | Earnshaw et al. | 395/325 |

FOREIGN PATENT DOCUMENTS 0123509 10/1984 European Pat. Off. .
0223570 5/1987 European Pat. Off. .
0242882 10/1987 European Pat. Off. .

*Primary Examiner*—Jerry Smith
*Assistant Examiner*—Dzung C. Nguyen
*Attorney, Agent, or Firm*—Staas & Halsey

[57] ABSTRACT

A memory accessing system for vector data processed, or to be processed, by a vector processing apparatus comprising plural vector processing units, each unit performing vector data processing for a corresponding portion of vector data elements, the elements being ordered and the vector data processing being carried out in the order of the elements. The system comprises plural memory access units corresponding to the plural vector processing units, each thereof accessing a predetermined portion of the elements of vector data in a main memory. Each memory access unit includes an address generator which receives information defining, and, based thereon, generates addresses for the respective, predetermined portion of the elements of vector data and a priority controller which receives the thus generated addresses from the respective address generators of the plural memory access units and selects an access to an address, from among the received plural addresses, as allowable based on a predetermined order of the elements of vector data and then outputs a memory access signal including the address for which access is selected as allowable by the priority controller, to the memory. The system operates for both direct and indirect addressing modes and, in the latter, address data for the indirect addressing for the predetermined portion of the vector data elements, when read out from the main storage by a corresponding memory access unit is temporarily stored in a vector register thereof and supplied to the address generators of all of the memory accessing units.

24 Claims, 11 Drawing Sheets

Fig. 6

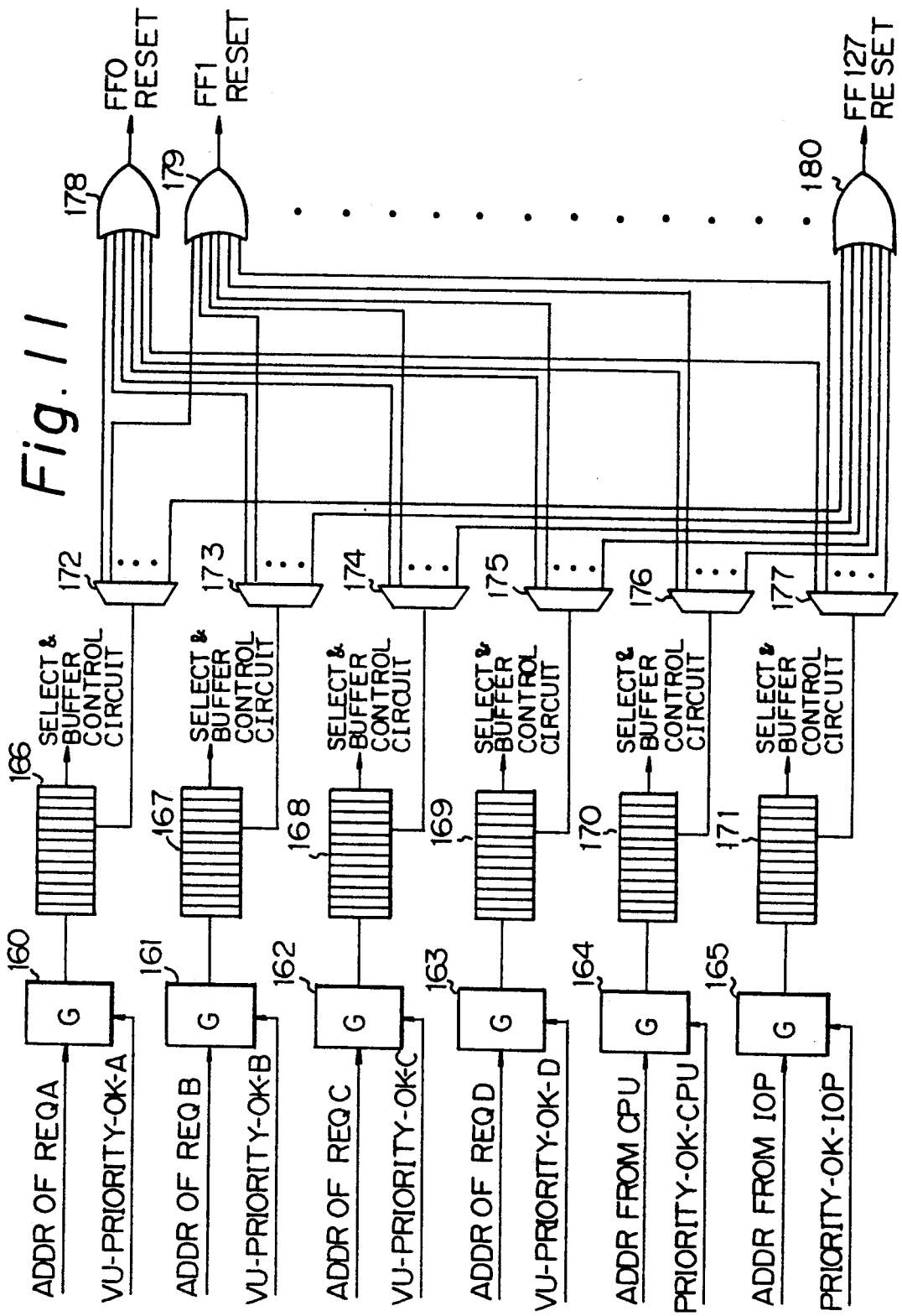

MEMORY ACCESS SYSTEM FOR VECTOR DATA PROCESSED OR TO BE PROCESSED BY A VECTOR PROCESSOR

This application is a continuation of application Ser. No. 07/431,897, filed Nov. 6, 1989, now abandoned.

BACKGROUND OF THE INVENTION (1) Field of the Invention

The present invention relates to a memory accessing system for a vector processing apparatus which carries out a vector calculation and to a vector processing apparatus incorporating the memory accessing system.

In scientific or technological calculations, loop calculations are frequently carried out. The loop calculations can be transformed into vector calculations, e.g., $A(i)+B(i)=C(i)$, $(i=0 \sim n-1)$.

To increase the speed of vector calculations, computer systems carrying out high speed calculations, such as supercomputers, are equipped with a vector processing apparatus for carrying out vector calculations, in addition to a scalar data processing apparatus.

In a vector processing apparatus, a plurality of vector processing units are provided, and each vector processing unit carries out a share of a vector calculation concurrently with the other vector processing units. For example, a vector calculation $A(i)+B(i)=C(i)$, $(i=0 \sim n-1)$ is shared by first and second vector processing units in such a manner that the first vector processing unit takes a half share of the vector calculation for half of the elements, $A(4m)+B(4m)=C(4m)$, and $A(4m+1)+B(4m+1)=C(4m+1)$, and the second vector processing unit takes the other half of the vector calculation for the other half of the elements, $A(4m+2)+B(4m+2)=C(4m+2)$, and $A(4m+3)+B(4m+3)=C(4m+3)$, where $0 \leq 4m$, and $4m+3 \leq n-1$, and n is the total number of elements, and the first and second vector processing units concurrently carry out respective shares of the vector calculation, for further increasing calculation speed.

In the above vector processing apparatus having a plurality of vector processing units, each of the plurality of vector processing units independently request access to the main storage, and also each of the scalar unit (CPU) and an input and output processor (IOP) independently requests access to the main storage. Therefore, arbitration regarding access to the main storage between the plurality of vector processing units, the scalar unit (CPU), and the input and output processor (IOP), must be carried out to avoid a conflict. In addition, the order of the elements of the vector data must be maintained in the result of the arbitration between accesses from the plurality of vector processing units.

(2) Description of the Related Art

FIG. 1 shows an outline of the construction of an example of a conventional vector processing apparatus having a plurality of vector processing units.

In FIG. 1, reference numeral 1 denotes a vector processing controller, 2 and 3 each denote a vector processing unit, 4 denotes a main storage, 5 and 9 each denote an address generator, 6 and 10 each denote a priority controller, 8 and 12 each denote a data buffer, 7 and 11 each denote a vector register, and 13 denotes a route for a control signal.

In this example, the vector processing unit 2 carries out calculations of the (4m)-th and (4m+1)-th elements, and the vector processing unit 3 carries out calculations of the (4m+2)-th and (4m+3)-th elements, where $0 \leq 4m$ and $4m+3 \leq n-1$, and n is the total number of elements.

When the vector processing controller 1 receives a vector instruction from a scalar unit (CPU) (not shown), the vector processing controller 1 supplies control data including a start signal, an operation code, which defines the action to be performed, e.g., writing or reading, a leading address (LA, an address of a top element of vector data), a distance (D, a distance between addresses of successive elements), and a vector length (the number of elements in a vector data), etc., to the address generators 5 and 9.

The address generator 5 in the vector processing unit 2 generates addresses for accessing the main storage 4 for the calculations of the (4m)-th and (4m+1)-th elements, and the address generator 9 in the vector processing unit 3 generates addresses for accessing the main storage 4 for the calculations of the (4m+2)-th and (4m+3)-th elements, based on the above control data.

The priority controller 6 in the vector processing unit 2 carries out an arbitration between requests for accesses to the main storage 4 for the (4m)-th and (4m+1)-th elements, requests from the scalar unit (CPU), and requests from the input and output processor (IOP), and gives allowance to one of the above requests (for the (4m)-th and (4m+1)-th elements) from the vector processing unit 2, based on the addresses generated in the address generator 5, and the order of the elements. The highest priority is given to the request from the input and output processor (IOP), the next highest priority is given to the request from the scalar unit (CPU), and the allowance is given in the order of the elements, i.e., the (4m)-th element has priority over the (4m+1)-th element.

Similarly, the priority controller 10 in the vector processing unit 3 carries out an arbitration between requests for accesses to the main storage 4 for the (4m+2)-th and (4m+3)-th elements, requests from the scalar unit (CPU), and requests from the input and output processor (IOP), and gives allowance to one of the above requests (for the (4m+2)-th and (4m+3)-th elements) from the vector processing unit 3, based on the addresses generated in the address generator 9, and the order of the elements. Similarly, the highest priority is given to the request from the input and output processor (IOP), the next highest priority is given to the request from the scalar unit (CPU), and the allowance is given in the order of the elements, i.e., the (4m+2)-th element takes precedence over the (4m+3)-th element.

Further, to maintain the order of the elements of the vector data across both the vector processing units 2 and 3, before allowing the access for an element (i), one of the vector processing units 2 and 3 must know whether or not the access for the element which must be allowed before the element (i) (i.e., an element designated by a smaller number than (i)) in the other vector processing unit, has been already allowed. For example, before allowing the access for the element 4m, the vector processing unit 2 must know whether or not the access to the main storage 4 for the element 4m−1 has already been allowed in the vector processing unit 3.

To assure the above order, in the construction of FIG. 1, the status of allowance in each vector processing unit is transmitted to the other vector processing unit through the route 13. However, in practice, each of the vector processing units 2 and 3 is formed on an individual circuit board, and therefore, the propagation delay time through the above route 13 is large compared with the clock cycle of high speed computers when reporting the status of allowance across the different circuit boards.

In addition, in the construction of FIG. 1, to avoid competition between requests from both the vector processing units 2 and 3, predetermined alternative accessible timings are respectively assigned for the (4m)-th and (4m+1)-th elements in the vector processing unit 2, and the (4m+2)-th and (4m+3)-th elements in the vector processing unit 3.

Usually, a main storage is comprised of a plurality of portions (banks or memory units), where each portion can be concurrently accessed, for example, the main storage 4 in the construction of FIG. 1 is comprised of four memory units, SU-0, SU-1, SU-2 and SU-3. For accessing these memory units, SU-0, SU-1, SU-2 and SU-3 from the vector processing units 2 and 3 without competition, the alternative timings as shown in FIG. 2, are assigned.

As mentioned above, in the conventional vector processing apparatus, each vector processing unit must wait to receive the status of allowance of access to the main storage from the other vector processing unit(s), before carrying out the arbitration. In addition, since, in the conventional vector processing apparatus, predetermined (fixed) alternative timings are assigned for a plurality of vector processing units as mentioned above, each vector processing unit cannot access the main storage at a time other than the above predetermined (fixed) time, even when objective portion of the main storage is not busy at that time. Namely, in the conventional vector processing apparatus, the accesses to the main storage from a plurality of vector processing units are not effectively carried out, and therefore, the total access time to the main storage for performing and completing a vector calculation is long.

SUMMARY OF THE INVENTION

An object of the present invention is to provide a memory access system for vector data processed, or to be processed, by a vector processing apparatus having a plurality of vector processing units, each concurrently carrying out a share of a vector processing operation, wherein accesses from a plurality of memory access (for vector processing) units to a main storage is effectively carried out, and the total access time to the main storage for carrying out the vector calculation is reduced.

According to the present invention, there is provided a memory access system, for such a vector processing apparatus for carrying out vector data processing, which fetches vector data from a main storage, for use by the vector processing apparatus in carrying out vector calculations, and which stores the processed vector data is said main storage, the vector processing apparatus comprising a plurality of vector processing units, each for carrying out vector data processing from a portion of elements which are assigned to the vector processing unit, among all such elements of vector data. The vector data processing in the plurality of vector processing units is concurrently carried out, all elements in a vector data are ordered, and the vector data processing is carried out in the order of the elements. In an embodiment in which the memory access system is incorporated directly in the vector processing apparatus, each of the above vector processing units comprises, as components of the corresponding unit of the memory access system, an address generator and a priority controller. The address generator concurrently generates addresses for accesses to said main storage for elements which are concurrently requested by said plurality of vector processing units. The priority controller determines one or more accesses as allowable, among the above accesses which are concurrently requested by the plurality of vector processing units, based on the above addresses concurrently generated in the address generator, and the above order of the elements, and outputs one or more signals for the accesses which are requested by its own vector processing unit, and are determined as allowable, to the main storage. Thus, according to the present invention, all the address information which is requested from all units of the vector processing apparatus for accesses to the main storage is generated and collected in each of the vector processing units, and therefore, the priority control for the access for each element of vector data can be carried out without receiving information as to the status of the access to the main storage from the other vector processing units. In addition, there is no limit to the timing for access to the main storage for each vector processing unit except the above priority control. Namely, the aforementioned causes for delay in access to the main storage in the conventional vector processing apparatus are eliminated by the present invention.

Further, each of the above vector processing unit comprises, as further components of the corresponding unit of the memory access system when incorporated therein, a vector register and an indirect addressing controller. Each vector register temporarily holds address data which has been read out from the main storage, and is to be used for address generation in the address generators in all of the plurality of vector processing units. Each indirect addressing controller controls reading operations of the above address data in the above vector register, and supplies the address data to all of the plurality of vector processing units, when an indirect addressing mode is instructed from the above vector processing controller. Each address generator generates addresses for vector processing of all the elements using the above address data from the above vector registers in all of the plurality of vector processing units, when the indirect addressing mode is instructed from the above vector processing controller. Thus, all the address data needed for indirect addressing read out from the main storage to the vector register in each of the vector processing units are supplied to each of the plural address generators in the respective vector processing units, and therefore, the address generator in each vector processing unit can generate all the addresses for access to the main storage from all the vector processing units in the indirect addressing mode of operation.

BRIEF DESCRIPTION OF THE DRAWINGS

In the drawings:

FIGS. 5 and 6 show constructions of the vector processing units 41 and 42;

FIG. 11 shows a detailed construction for the delay circuits 101 and 101' and the relating construction in the priority control portions 72 and 72' in the construction of FIGS. 5 and 6.

DESCRIPTION OF THE PREFERRED EMBODIMENTS

Figure 3:
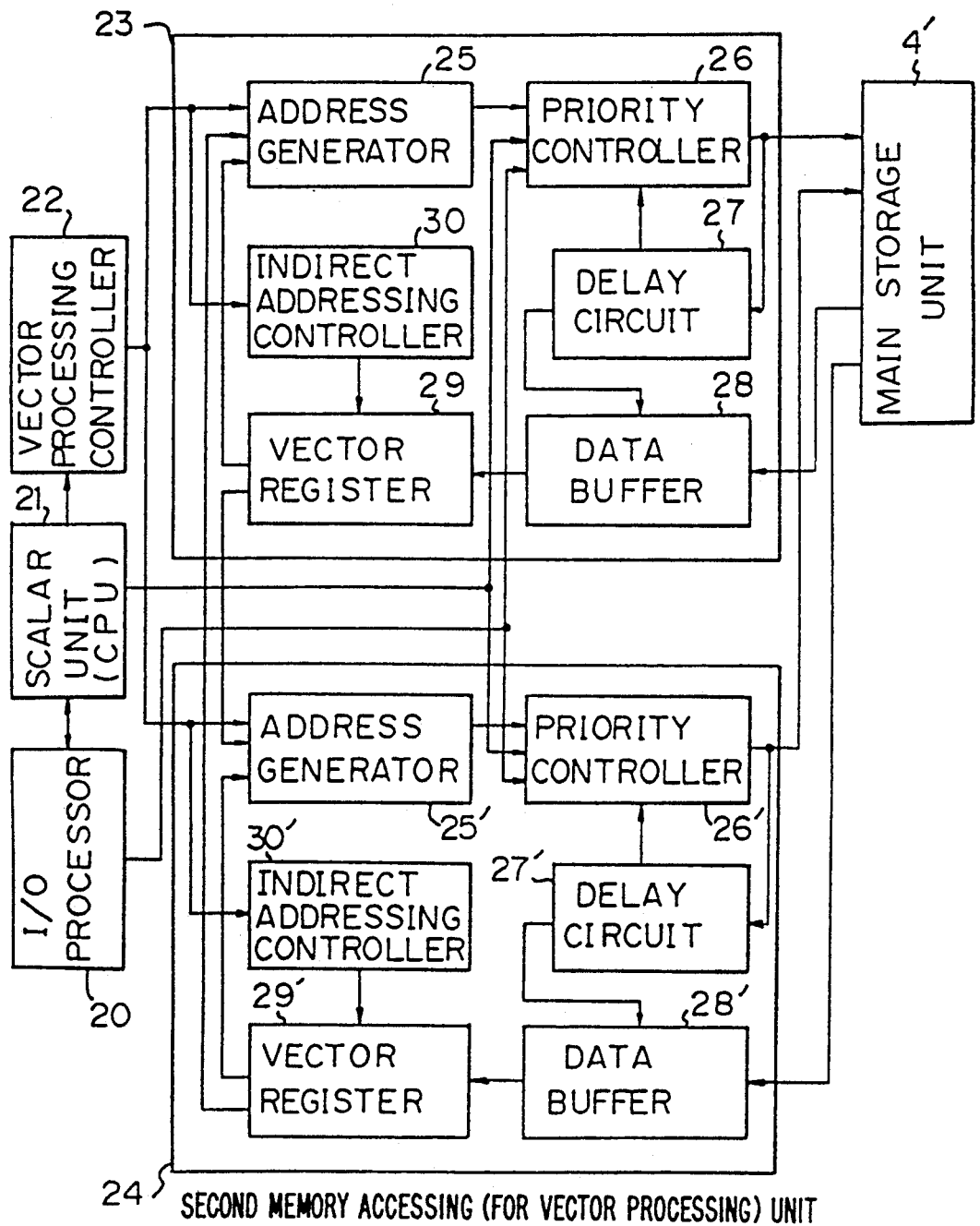
FIG. 3 shows an outline of the construction of a first embodiment of the present invention.

FIG. 3 shows an outline of the construction of a first embodiment of the present invention.

In FIG. 3, reference numeral 20 denotes an input and output processor (IOP), 21 denotes a scalar unit (CPU), 22 denotes a vector processing controller, 23 denotes a first memory accessing (for vector processing) unit, 24 denotes a second memory accessing (for vector processing) unit, 25 and 25' each denote an address generator, 26 and 26' each denote a priority controller, 27 and 27' each denote a delay circuit, 28 and 28' each denote a data buffer, 29 and 29' each denote a vector register, 30 and 30' each denote an indirect addressing controller, and 4' denotes a main storage.

The input and output processor (IOP) 20 controls data transfer between the main storage 4' and input/output devices which are provided in the computer system having the vector processing apparatus according to the present invention.

The scalar unit (CPU) 21 is a central processing unit of the computer system. The scalar unit (CPU) 21 fetches instructions and data from the main storage 4', executes instructions other than vector instructions, and transfers vector instructions to the vector processing controller 22.

Figure 1:
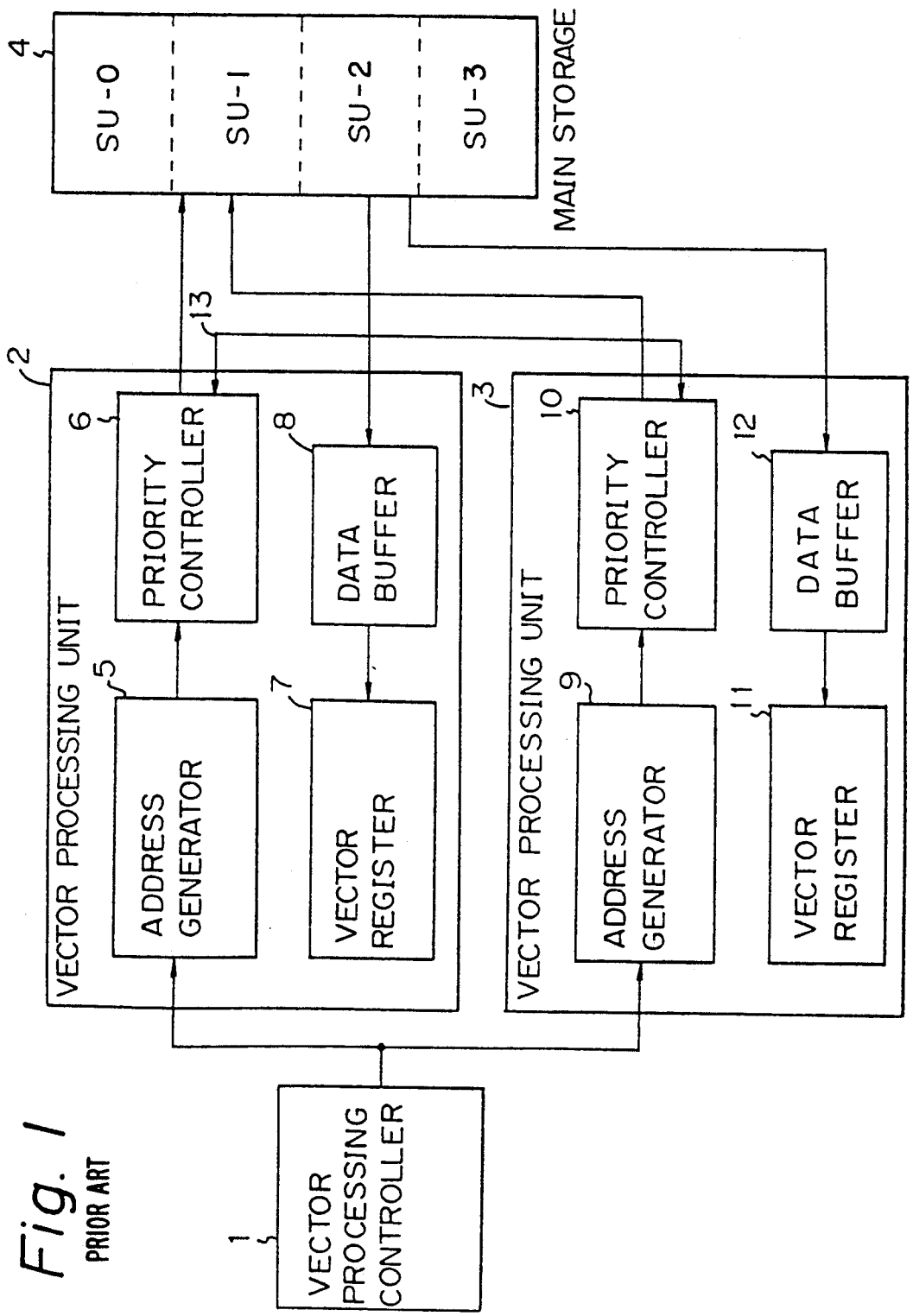
FIG. 1 shows an outline of the construction of an example of a conventional vector processing apparatus having a plurality of vector processing units.
Figure 2:
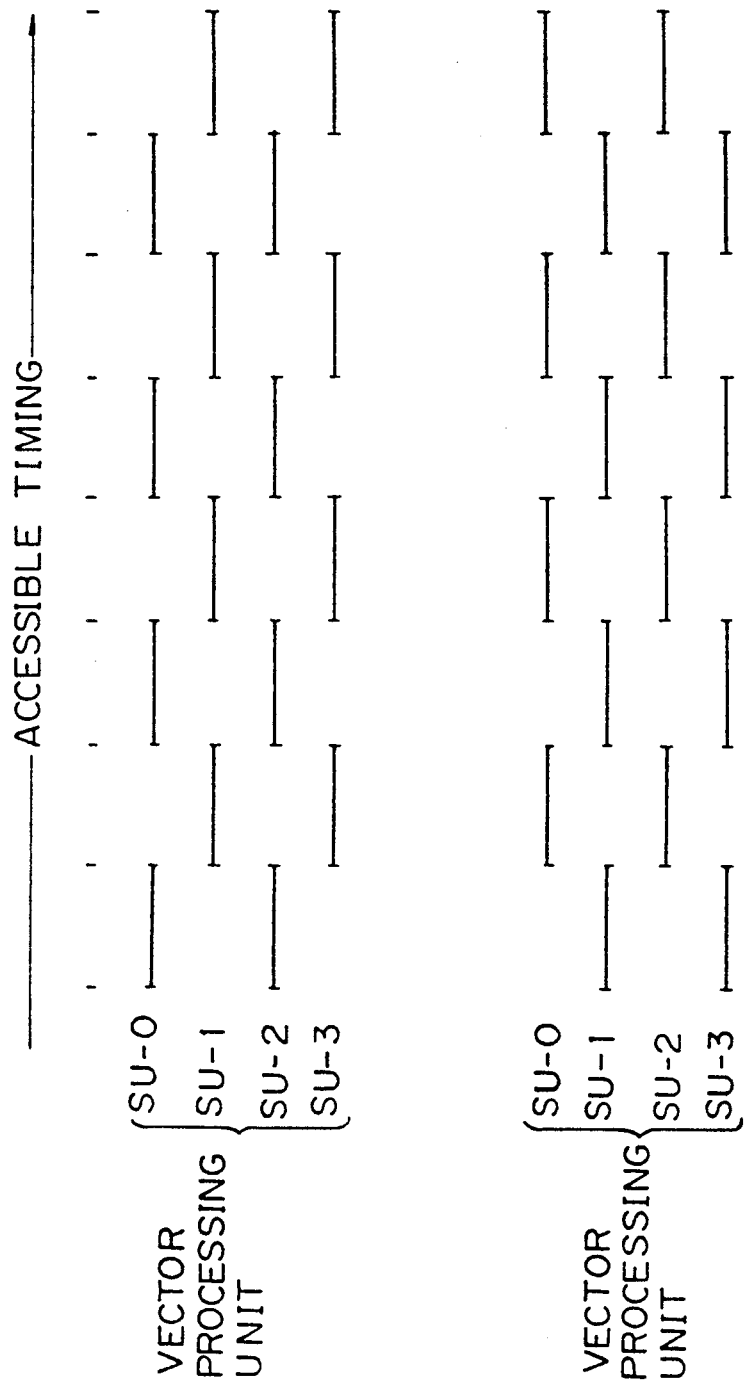
FIG. 2 shows predetermined alternative accessible timings which are respectively assigned for the (4m)-th and (4m+1)-th elements in the vector processing unit 2, and the (4m+2)-th and (4m+3)-th elements in the vector processing unit 3 in the construction of FIG. 1.

When the vector processing controller 22 receives a vector instruction from a scalar unit (CPU) 21, just as does the vector processing controller 1 in FIG. 1, the vector processing controller 22 supplies control data including a start signal, an operation code which defines the action to be performed, e.g. (writing or reading), a leading address (LA, i.e., an address of a top element of vector data), a distance (i.e., a distance between addresses of successive elements), and a vector length (i.e., the number of elements in a vector data), etc., to the first and second memory accessing (for vector processing) units 23 and 24, based on the vector instruction.

The memory accessing (for vector processing) units 23 and 24 each carries out vector data processing for half of the elements out of the total elements of vector data, and the vector data processing in the memory accessing (for vector processing) units 23 and 24 is concurrently carried out. The vector data processing is carried out in the order of the elements, i.e., from the element 0 to the element n−1 when the vector length is n.

The address generator 25 in the memory accessing (for vector processing) unit 23 concurrently generates addresses for accesses to the main storage 4' for elements which are concurrently requested by both the memory accessing (for vector processing) units 23 and 24.

Similarly, the address generator 25' in the memory accessing (for vector processing) unit 24 concurrently generates addresses for accesses to the main storage 4' for the elements which are concurrently requested by both the memory accessing (for vector processing) units 23 and 24. The addresses concurrently generated in both the address generators 25 and 25' are the same.

As the main storage 4 in FIG. 1, the main storage 4' comprises a plurality of memory units (or banks) which are concurrently accessible from the memory accessing (for vector processing) units 23 and 24, the scalar unit (CPU) 21, and the input and output processor 20.

The priority controller 26 determines at most one access as being allowable, among the accesses which are concurrently requested by the memory accessing (for vector processing) units 23 and 24, an access requested by the central processing unit 21, and an access requested by the input and output processor 20, for each of the memory units (or banks) of the main storage 4', based on the addresses concurrently generated in the address generator 25, an address in the access requested by the central processing unit 21, an address in the access requested by the input and output processor 20, and the order of the elements. Then, priority controller 26 outputs one or more signals for the accesses which are requested by its own memory accessing (for vector processing) unit 23, and are determined as allowable, to the main storage 4'.

Similarly, the priority controller 26' determines at most one access as being allowable, among the accesses which are concurrently requested by the memory accessing (for vector processing) units 23 and 24, an access requested by the central processing unit 21, and an access requested by the input and output processor 20, for each of the memory units (or banks) of the main storage 4', based on the addresses concurrently generated in the address generator 25, an address in the access requested by the central processing unit 21, an address in the access requested by the input and output processor 20, and the order of the elements. Then, priority controller 26 outputs one or more signals for the accesses which are requested by its own vector processing unit 24, and are determined as allowable, to the main storage 4'.

If the addresses which are concurrently requested by the memory accessing (for vector processing) units 23 and 24, the central processing unit 21, and the input and output processor 20, are related to different memory units (or banks), there is no competition between these requests, and therefore, all these requests are determined to be allowable, and signals for all the accesses requested in each memory accessing (for vector processing) unit are then transferred to the main storage 4' from each of the vector processing units 23 and 24.

If two addresses which are concurrently requested for access from any of the memory accessing (for vector processing) units 23 and 24, the central processing unit 21, and the input and output processor 20, are in the same memory unit (or bank), the access priority to the main storage 4' is determined in the following order: the highest priority access is given to the input and output processor 20; the second highest priority access is given to the central processing unit 21; the next highest priority is given to the access for the element in the highest order (for example, the element A(i) designated by the smallest number i) among the requested accesses; . . . ;

and thus, the lowest priority access is given to the element in the lowest order (for example, the element A(j) designated by the largest number j) among the requested accesses.

Although not shown in FIG. 3, each of the priority controllers 26 and 26' contains a plurality of flag registers for holding and indicating a busy status of respective portions of the main storage 4', i.e., a corresponding set of flag registers for holding and indicating a busy status of respective portions of the main storage 4' is provided in each of the priority controllers 26 and 26' of the respective vector processing units 23 and 24. Both the priority controllers 26 and 26' set one or more corresponding flag registers of its respective set thereof when determining one or more accesses as allowable, and resets each flag register at a first predetermined time after the setting of the flag register. The first predetermined time corresponds to the time each memory unit (or bank) is occupied for an access, or the time an access route to each memory unit (or bank) is occupied for an access.

The above first predetermined time is generated by the delay circuits 27 and 27' in memory accessing (for vector processing) units 23 and 24, respectively. The delay circuits 27 and 27' input, from the outputs of priority controllers 26 and 26', corresponding address information when any one of the flag registers is set, and output the address information the first predetermined time after the input, and the outputs of the delay circuits 27 and 27' are each decoded in a decoder (not shown in FIG. 3), and the output bits of the decoder are applied to the above plurality of flag registers as reset signals.

The vector registers 29 and 29' each provide for temporarily holding data which is received thereby, as read out from the main storage 4', until all such data is read out from the corresponding vector registers 29 and 29' for the respective parts of a vector calculation.

The data buffer circuits 28 and 28' each temporarily hold the data which is read out from the main storage 4', before inputting the data into the corresponding vector registers 29 and 29'.

The delay circuits 27 and 27' each have input thereto and receives the corresponding address information, when an access among the accesses requested by its own memory accessing (for vector processing) unit is determined as allowable, and then output the address information to the corresponding one of the data buffer circuits 28 and 28' to provide the timing of the input of the data into the corresponding one of the vector registers 29 and 29', a second predetermined time after the above discussed input thereto of the address information. In each of the memory accessing (for vector processing) units 23 and 24, data which is fetched from the main storage 4' is initially written in the vector register 29 or 29' through the buffer registers 28 or 28', and then the data is read out for performances of the vector calculation (the vector processing components, or devices, for performing the vector calculations in the memory accessing (for vector processing) units are not shown). Data obtained as a result of the vector calculation in each memory accessing (for vector processing) unit 23 or 24 is also held initially in the corresponding vector register 29 or 29' before being stored in the main storage 4'.

The above second predetermined time is also generated by the delay circuits 27 and 27' in the respective vector processing units 23 and 24. The delay circuits 27 and 27' are each constructed by a shift register having a plurality of stages. In each cycle, address information held in each stage is shifted to a next stage, and the delays of the above first and second predetermined times are obtained from different stages in the shift register.

In addition, in each of the memory accessing (for vector processing) units 23 and 24, the corresponding vector register 29 or 29' temporarily holds address data for indirected addressing, which has been read out from the main storage 4', as well as the vector data for the vector calculation, and the address data is supplied for generating effective addresses in the indirect addressing mode of operation of the address generators 25 and 25' in the respective memory accessing (for vector processing) units 23 and 24.

Each of the indirect addressing controllers 30 or 30' controls reading operations of the address data in the vector register 29 or 29' in its own vector processing unit 23 or 24, and controls the supply of the address data to both the vector processing units 23 and 24, when an indirect addressing mode is instructed from the vector processing controller 22.

The address generator 25 or 25' in each memory accessing (for vector processing) unit 23 or 24 generates effective addresses for vector processing of all the elements using the above address data supplied from the vector registers 29 and 29' in both the memory accessing (for vector processing) units 23 and 24, when the indirect addressing mode is instructed from the vector processing controller 22.

Namely, when indirect addressing is instructed by the vector processing controller 22, address data for the indirect addressing for the above part of the elements is read out from the main storage 4' by each memory accessing (for vector processing) unit, and is temporarily held in a vector register in each memory accessing (for vector processing) unit, and the address data held in the vector register (29 or 29'), in each memory accessing (for vector processing) unit, is supplied to the address generators 25 and 25' in both the memory accessing (for vector processing) units 23 and 24.

Figure 4:
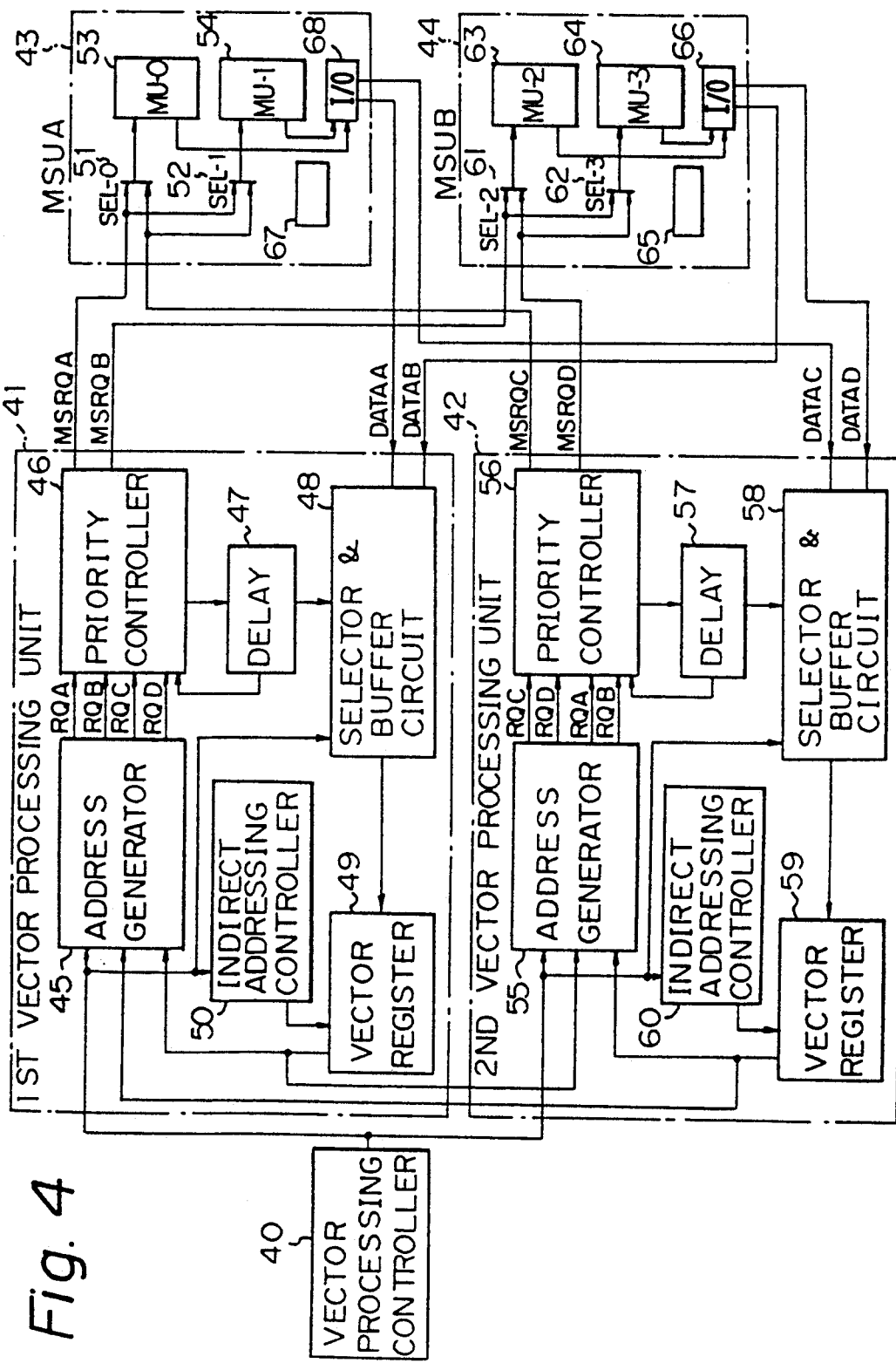
FIG. 4 shows an outline of the construction of a second embodiment of the present invention.

FIG. 4 shows a second embodiment of the present invention.

The construction of the vector processing apparatus shown in FIG. 4 is an example of the above-mentioned construction of the memory access system (and vector processing apparatus) shown in FIG. 3. As in the case of FIG. 3, the memory access systems may be separate from the vector processing apparatus, but in the following description and in FIG. 4 (and likewise as to the remaining figures herein and the related descriptions thereof), the memory access system is described in the context that the components of each unit thereof are incorporated in the corresponding vector processing unit of the vector processing apparatus.

In FIG. 4, reference numeral 40 denotes a vector processing controller, 41 denotes a first vector processing unit, 42 denotes a second vector processing unit, 45 and 55 each denote an address generator, 46 and 56 each denote a priority controller, 47 and 57 each denote a delay circuit, 48 and 58 each denote a data buffer, 49 and 59 each denote a vector register, 50 and 60 each denote an indirect addressing controller, 43 and 44 denote the main storage unit A and the main storage unit B, 51, 52, 61, and 62 each denote a selector, 53, 54, 63, and 64 each denote a memory unit, 65 and 67 each denote a memory control circuit, and 66 and 68 each denote an input/output circuit.

The vector processing apparatus comprises first and second vector processing units 41 and 42; the first vector processing unit 41 carries out vector processing of the (4m)-th and (4m+1)-th elements, and the second vector processing unit 42 carries out vector processing of the (4m+2)-th and (4m+3)-th elements. Namely, the first vector processing unit 41 accesses the main storage units A 43 and B 44 for the (4m)-th and (4m+1)-th elements, and the second vector processing unit 42 accesses the main storage units A 43 and B 44 for the (4m+2)-th and (4m+3)-th elements.

In the construction of FIG. 4, two main storage units 43 ("MSUA" or "A43") and 44 ("MSUB" or "B44") are provided, and data of the (4m)-th and the (4m+2)-th elements are stored in the main storage unit A 43, and data of the (4m+1)-th and the (4m+3)-th elements are stored in the main storage unit B 44.

In the main storage unit A 43, signals MSRQA for accessing the main storage unit A 43 for the (4m)-th elements from the vector processing unit 41, and signals MSRQC for accessing the main storage unit A 43 for the (4m+2)-th elements from the vector processing unit 42 are applied to the memory unit 53 through the selector 51, and to the memory unit 54 through the selector 52. In the main storage unit B 44, signals MSRQB for accessing the main storage unit B 44 for the (4m+1)-th elements from the vector processing unit 41, and signals MSRQD for accessing the main storage unit B 44 for the (4m+3)-th elements from the vector processing unit 42 are applied to the memory unit 63 through the selector 61, and to the memory unit 64 through the selector 62.

Although not shown, each of the memory units 53, 54, 63, and 64 comprises thirty-two banks, and each bank can be concurrently accessed. The access to these banks is controlled by the memory control circuit 67 in the main storage unit A 43, and by the memory control circuit 65 in the main storage unit B 44, based on address information which is included in the above signals MSRQA, MSRQB, MSRQC, and MSRQD. Although not shown, each of the memory units 53, 54, 63, and 64 further comprises a demultiplexer for delivering the above signals MSRQA, MSRQC, MSRQB and MSRQD from the selectors 51 and 52, or 61 and 62 to an objective bank in each cycle. The memory control circuit 67 or 65 controls the demultiplexer. Further, input/output data of the banks in each main storage unit 43 or 44 is selected at the input/output circuit 68 or 66 under the control of the memory control circuit ("I/0").

Figure 5:
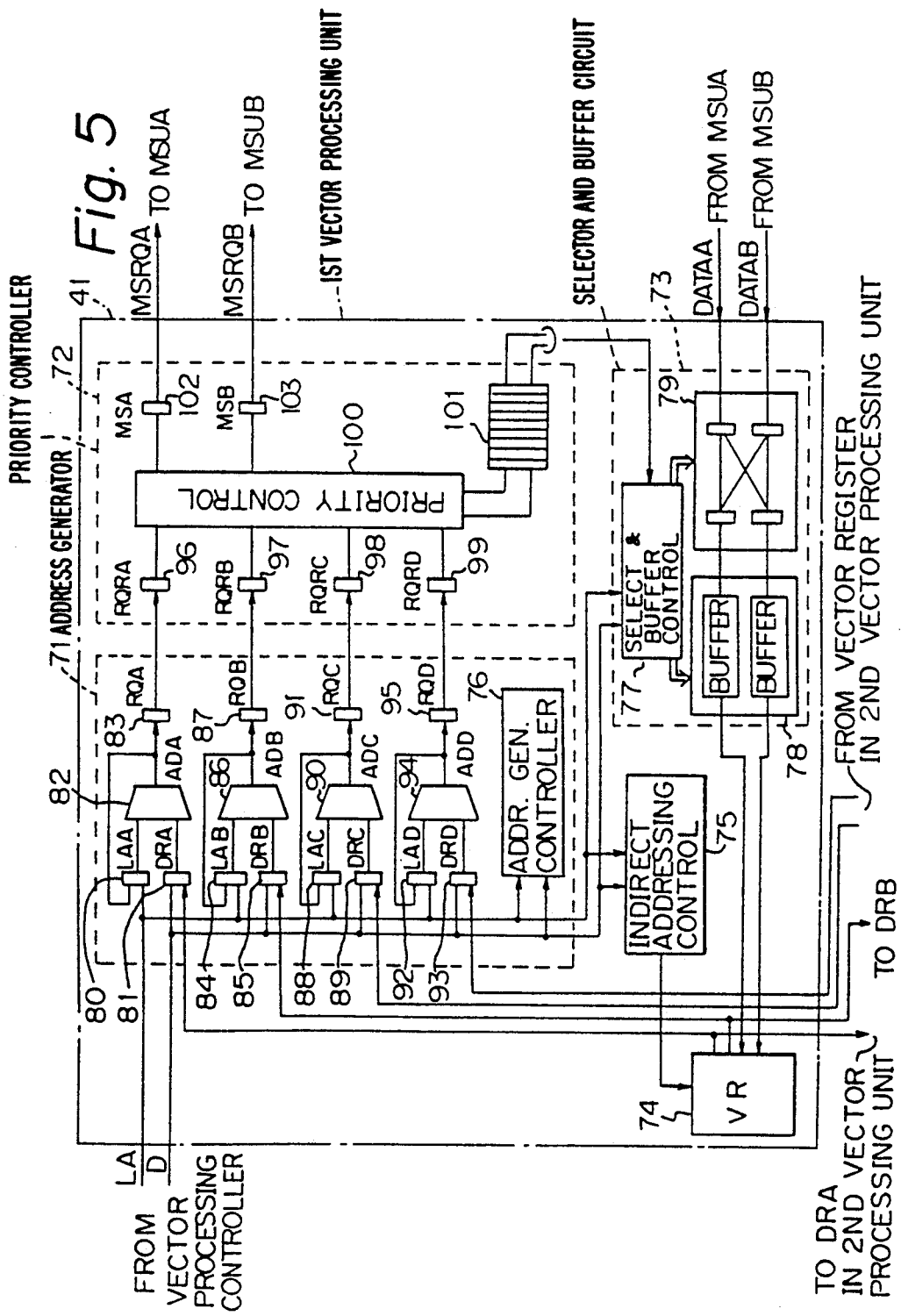
Figure 6:
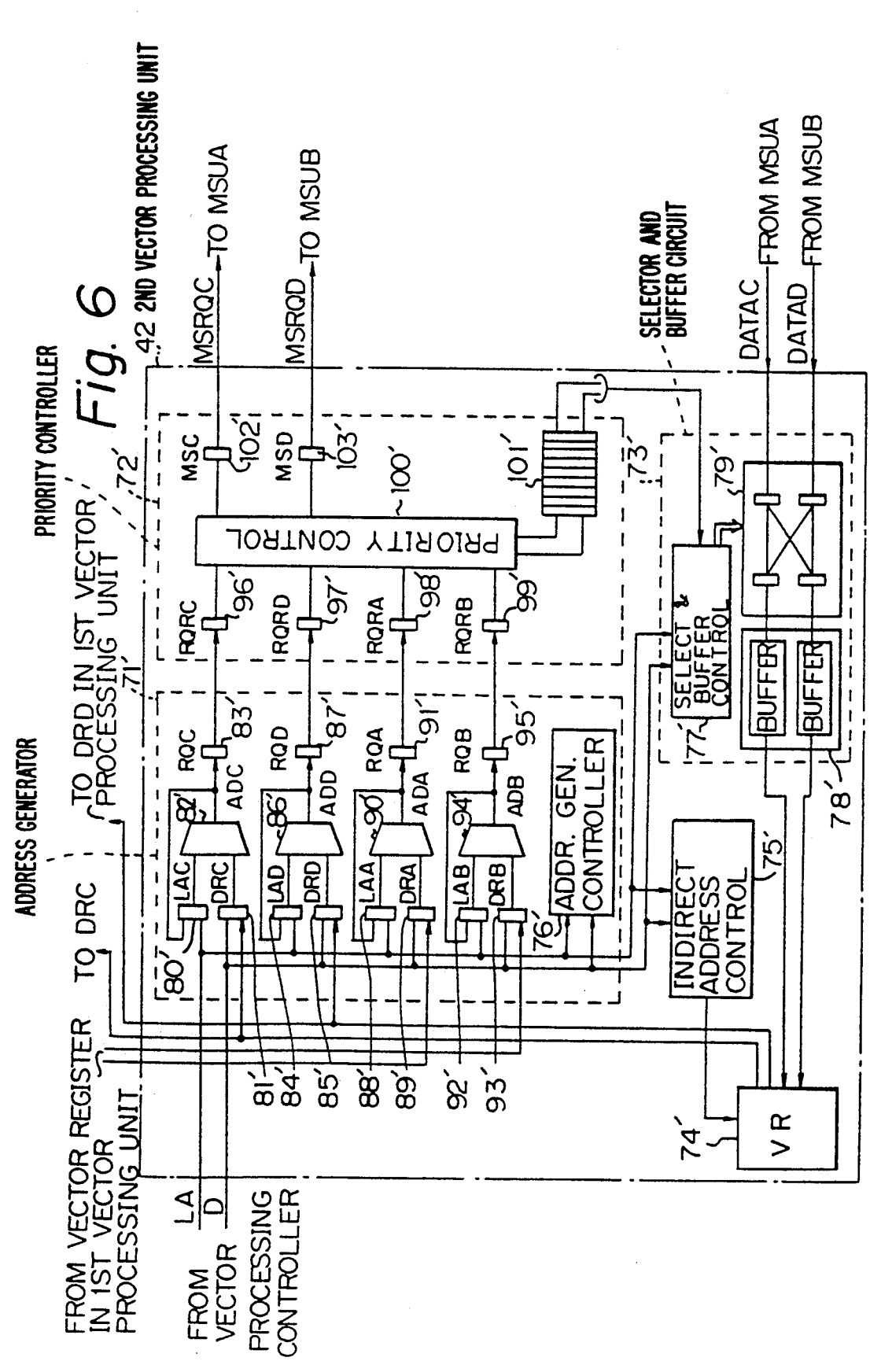

FIGS. 5 and 6 show constructions of the vector processing units 41 and 43, common elements being identified by the identical but primed numerals in FIG. 6.

In FIG. 5, reference numeral 71 denotes an address generator, 72 denotes a priority controller, 73 denotes a data selector & buffer circuit, 74 denotes a vector register, 75 denotes an indirect addressing controller, 76 denotes an address generating controller, 77 denotes a selector & buffer control circuit, 78 denotes a buffer circuit, 79 denotes a matrix circuit, 80, 81, 84, 85, 88, 89, 92, and 93 each denote a register, 82, 86, 90, and 94 each denote an adder, 83, 87, 91, 95, 96, 97, 98, 99, 102, and 103 each denote a register for holding the aforementioned signals MSRQA, MSRQB, MSRQC, and MSRQD for accessing the main storage units, 100 denotes a priority control circuit, 101 denotes a delay circuit.

When a start signal, an operation code, which defines the action to be performed, e.g., writing or reading and information used to generate addresses of the elements of the vector data, including, a leading address (LA, an address of a top element of vector data), a distance (a distance between addresses of successive elements), and a vector length (the number of elements in a vector data), are given from the vector processing controller 40, the leading address is held in the registers 80, 84, 88, and 92, and a 0 value is held in the register 81, the distance value is held in the register 85, a value equal to two times the distance value is held in the register 89, and a value equal to three times the distance value is held in the register 93, at the first cycle. At the next cycle, and the later cycles, the distance value is held in the registers 81, 82, 83, and 84.

Then, the sums of the outputs of the pairs of the registers 80 and 81, 84 and 85, 88 and 89, and 92 and 93, are respectively calculated in the adders 82, 86, 90, and 94. The adders 82, 86, 90, and 94 each output an effective address ("ADA", "ADB", "ADC" and "ADD", respectively) for accessing the main storage units ("MSVA . . . MSVD", respectively) for the (4m)-th, (4m+1)-th, (4m+2)-th and (4m+3)-th elements, and these effective addresses are each held in the registers 83, 87, 91, and 95, respectively, together with the operation code. All the above operations are controlled by the address generating controller 76.

Figure 7:
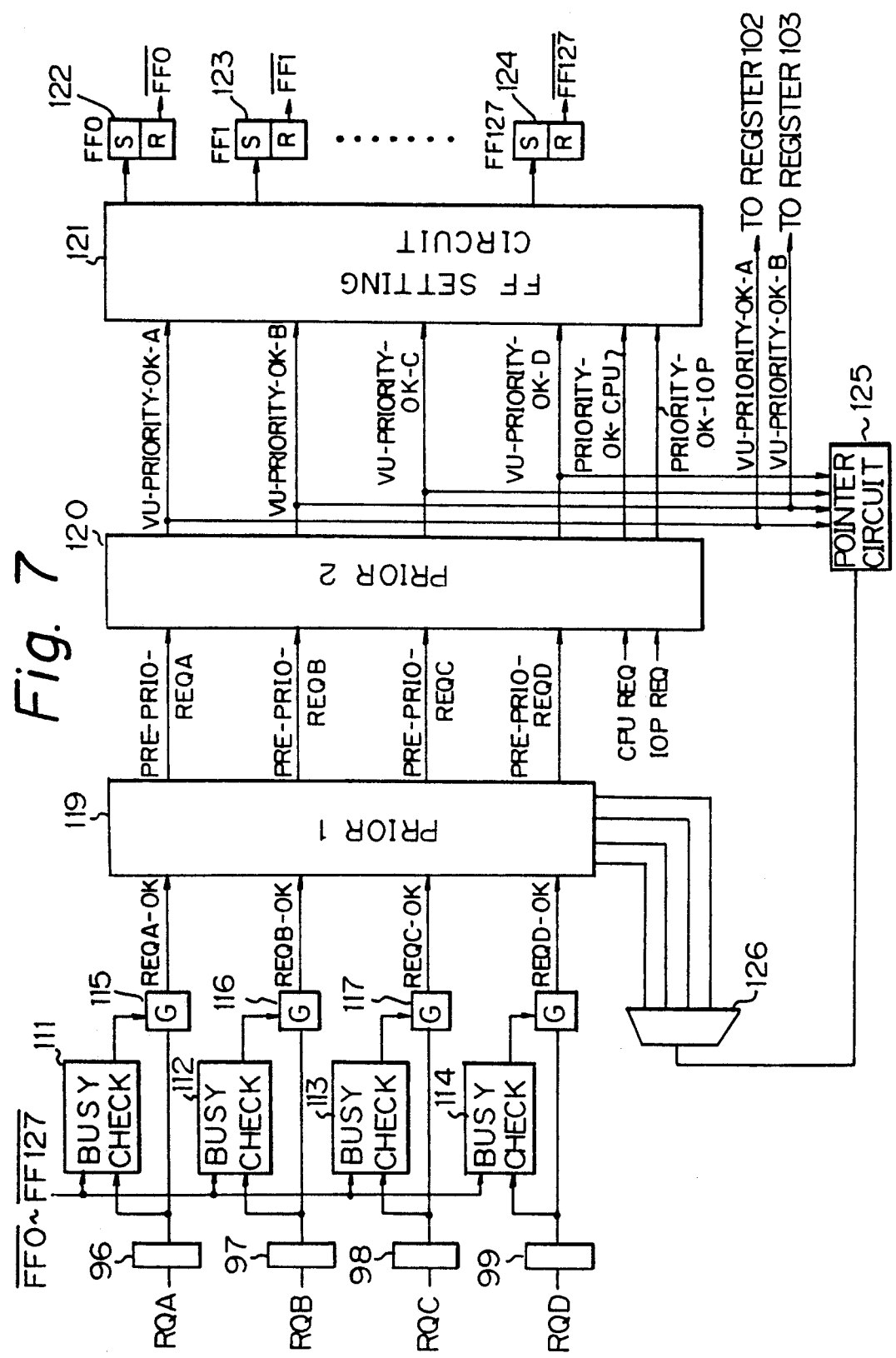
FIGS. 7 and 8 respectively show constructions of the priority control circuits 100 and 100' in FIGS. 5 and 6.
Figure 8:
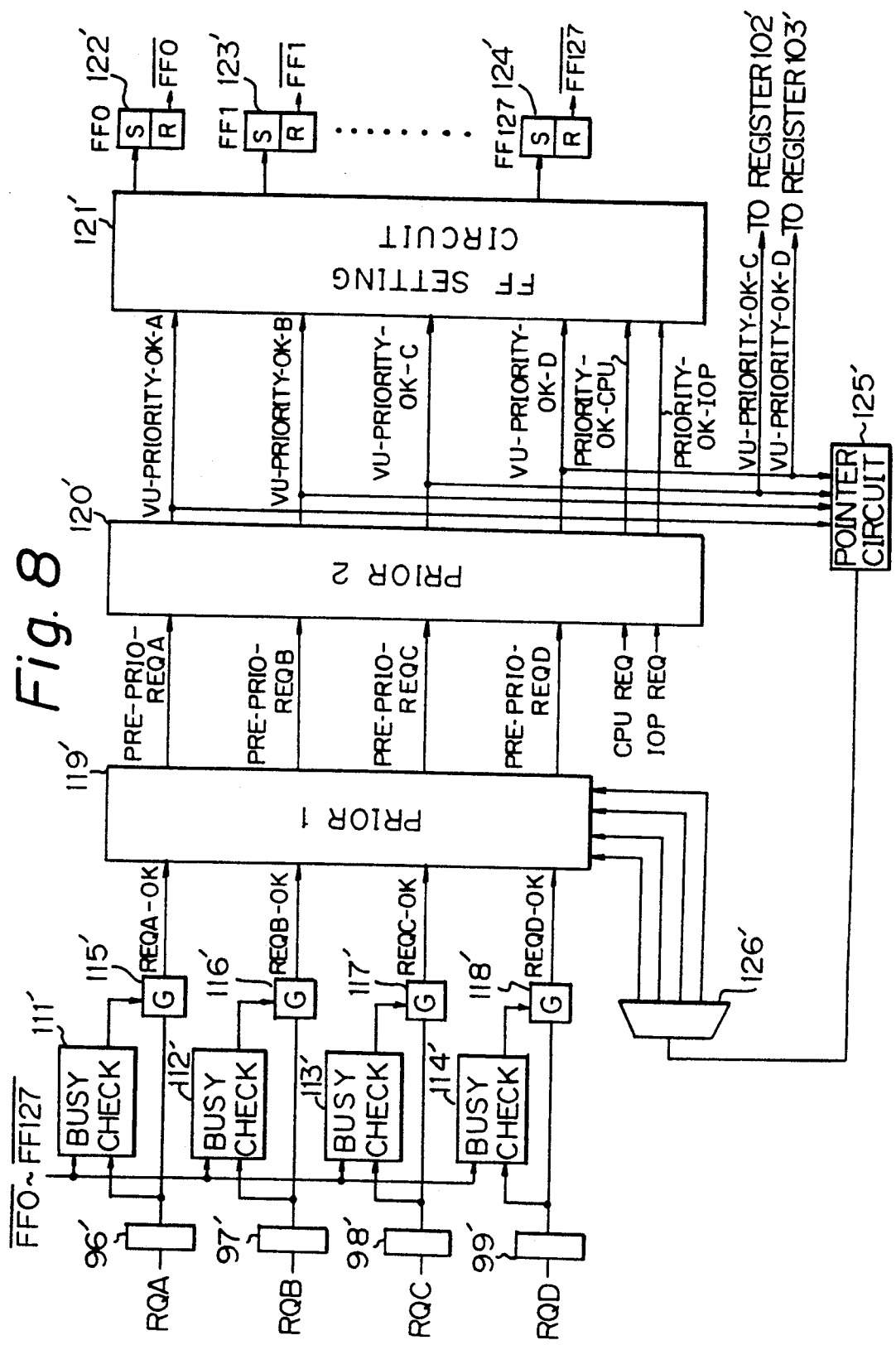

FIGS. 7 and 8 respectively show constructions of the priority control circuits 100 and 100' in FIGS. 5 and 6.

In FIG. 7, registers 96, 97, 98, 99 are the same as shown in FIG. 5, and the outputs of the registers 83, 87, 91, and 99 are each held in the corresponding registers 96, 97, 98, and 98, respectively. In FIG. 7, reference numerals 111, 112, 113, and 114 each denote a busy check circuit, 115, 116, 117, and 118 each denote a gate circuit, 119 denotes a first priority control portion, 120 denotes a second priority control portion, 121 denotes an FF setting circuit, 122, 123, . . . 124 each denote an RS-type flip-flop circuit, 125 denotes a pointer circuit, and 126 denotes a decoder.

The RS-type flip-flop circuits 122, 123, . . . 124 correspond to the plurality of busy flag registers explained in the first embodiment, and are provided for each bank in the memory units 53, 54, 63, and 64, for indicating whether or not each bank is occupied by an access operation.

Each of the busy check circuits 111, 112, 113, 114 determines whether or not a bank which is requested for an access for a corresponding element is busy, based on an effective address held in a corresponding register 96, 97, 98, or 99.

Figure 9:
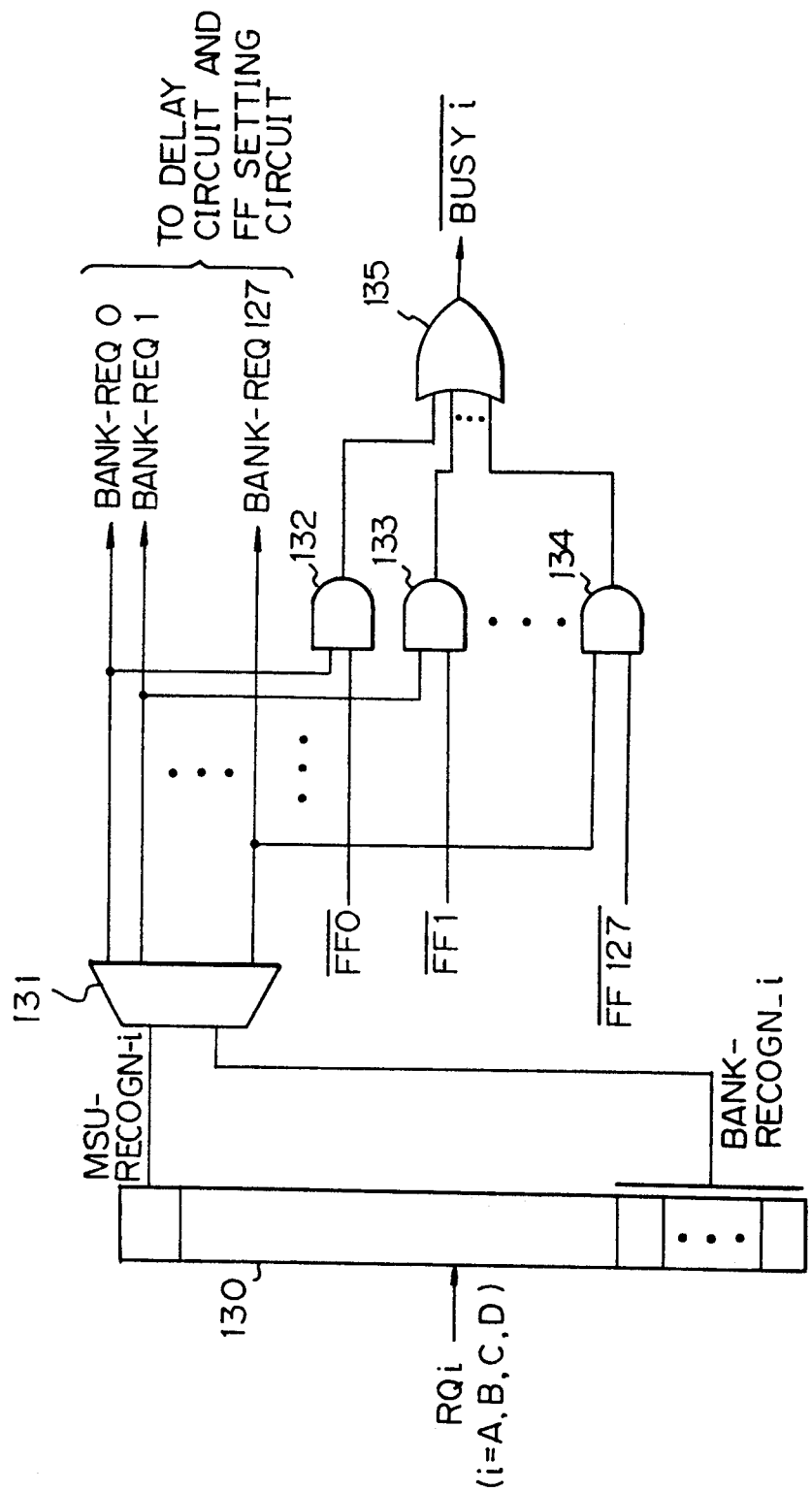
FIG. 9 shows a construction for the busy check circuits 111-114 and 111'-114' in the construction of FIGS. 7 and 8.

FIG. 9 shows a construction for the busy check circuits 111-114 and 111'-114' in the construction of FIGS. 7 and 8, respectively.

In FIG. 9, reference numeral 130 denotes a register, 131 denotes a decoder, 132 to 134 each denote an AND circuit, and 135 denotes an OR circuit.

The register 130 represents one of the registers 96, 97, 98, and 99 shown in FIG. 7, or the registers 96', 97', 98', and 99' shown in FIG. 8, and the input and the output of the register 130 is denoted by RQi, where RQi is RQA, RQB, RQC, or RQD. A bit indicating the main storage unit (43 or 44) among the address bits of the RQi, which is denoted by MSU-RECOGN-i, and a portion indicating an objective bank among the address bits of the RQi, which is denoted by BANK-RECOGN-i, are input in parallel into the decoder 131. Each output BANK-REQ 0, BANK-REQ 1, . . . BANK-REQ 127 (which corresponds to a total of 128 banks in four memory units 53, 54, 63, and 64) of the decoder 131 indicates whether or not the corresponding request for the access is requesting an address in each bank.

The above outputs BANK-REQ 0, BANK-REQ 1, ... BANK-REQ 127 are each input into one input terminal of a corresponding one of the AND circuits 132, 133, ... 134, where the AND circuits 132, 133, ... 134 correspond to the 128 banks. To the other input terminal of each of the AND circuits 132, 133, ... 134, a corresponding one of inverted outputs $\overline{FF0}$, $\overline{FF1}$, ... $\overline{FF127}$ of the RS-type flip-flop circuits 122, 123, ... 124, is input. The outputs of all the AND circuits 132, 133, ... 134 are input into the OR circuit 135, and thus, the output $\overline{BUSY}$ i of the OR circuit 135 indicates whether or not a bank for which access is requested for the corresponding element is busy.

The result of the busy check $\overline{BUSY}$ i, where i is A, B, C, or D, is applied to a corresponding gate circuit 115, 116, 117, or 118 as a control signal. When the bank requested for the access for the corresponding element is not busy, the output RQA, RQB, RQC, or RQD of the corresponding register 96, 97, 98, or 99 is applied to the first priority control portion 119 through a corresponding gate circuit 115, 116, 117, or 118, as a first-stage effective access signal REQA-OK, REQB-OK, REQC-OK, or REQD-OK.

The first priority control portion 119 allows one of the above first-stage effective access signal or signals REQA-OK, REQB-OK, REQC-OK, or REQD-OK to enter the second priority control portion 120 as a second-stage effective access signal PRE-PRIO-REQA, PRE-PRIO-REQB, PRE-PRIO-REQC, or PRE-PRIO-REQD, where the allowed signal is determined in the order of the elements, i.e., one of the above effective signals corresponding to a next element (j+1) to the last element (j) for which an access to one of the main storage units has already been allowed, is selected, based on information on the status of the former accesses, which information is obtained through the pointer circuit 125 and the decoder 126, as explained later.

The second priority control portion 120 determines the above second-stage effective access signal PRE-PRIO-REQA, PRE-PRIO-REQB, PRE-PRIO-REQC, PRE-PRIO-REQD as a final-stage effective access signal VU-PRIORITY-OK-A, VU-PRIORITY-OK-B, VU-PRIORITY-OK-C, or VU-PRIORITY-OK-D, and outputs the final-stage effective access signal to the FF setting circuit 121, when neither a request CPUREQ for access from the scalar unit (CPU), nor a request IOPREQ for access from the input and output processor (IOP) is active.

When a request for access from the input and output processor (IOP) is active, the above second priority control portion 120 determines and outputs the signal IOPREQ as a final-stage effective access signal PRIORITY-OK-IOP. When a request for access from the input and output processor (IOP) is not active, and a request CPUREQ for access from the scalar unit (CPU) is active, the above second priority control portion 120 determines and outputs the signal CPUREQ from the scalar unit (CPU) as a final-stage effective access signal PRIORITY-OK-CPU.

Only the oututs VU-PRIORITY-OK-A and VU-PRIORITY-OK-B (each correspond to MSRQA and MSRQB in FIGS. 4 and 5) of the second priority control portion 120 corresponding to the requests from its own vector processing unit 41, are sent to an objective main storage unit through the registers 102 and 103, respectively.

The outputs of the second priority control portion 120 corresponding to the requests from the vector processing units 41 and 42 are input into the pointer circuit 125, and the pointer circuit 125 recognizes the status of the access to the main storage units 43 and 44 by the vector processing units 41 and 42. The output of the pointer circuit 125 is zero when an access last allowed in the second priority control portion 120 is for the (4 m)-th element, the output is one when an access last allowed in the second priority control portion 120 is for the (4m+1)-th element, the output is two when an access last allowed in the second priority control portion 120 is for the (4m+2)-th element, and the output is three when an access last allowed in the second priority control portion 120 is for the (4m+3)-th element.

The above first and second priority control portions are each constructed by a hardware logic circuit.

The above output of the pointer circuit 125 is decoded in the decoder 126, and then supplied to the first priority control portion 119 as the aforementioned information on the status of the former accesses.

Although not shown in FIG. 7, the FF setting circuit 121 receives the aforementioned outputs BANK-REQ 0, BANK-REQ 1, ... BANK-REQ 127 of the decoders 131 (as shown in FIG. 9) in the busy check circuits 111, 112, 113, and 114, as well as the above outputs of the second priority control portion 121.

Figure 10:
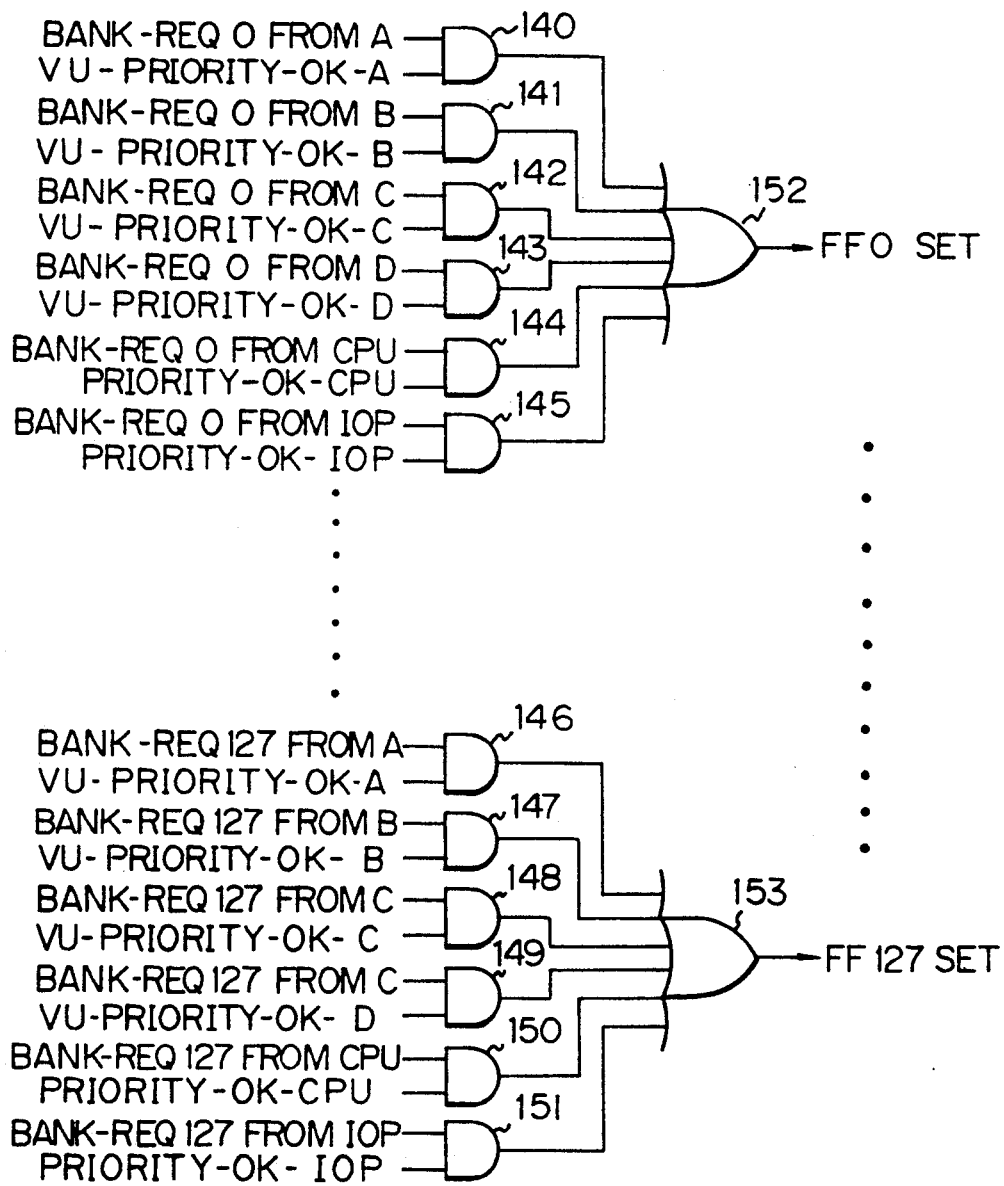
FIG. 10 shows a construction for the FF setting circuits 121 and 121' in the construction of FIGS. 7 and 8.

FIG. 10 shows a construction for the FF setting circuits 121 and 121' in the construction of FIGS. 7 and 8.

In FIG. 10, reference numerals 140 to 151 each denote an AND circuit, and 152 and 153 each denote an OR circuit. In addition, BANK-REQ k from A denotes the output signal of the decoder 131 in the busy check circuit 111, BANK-REQ k from B denotes the output signal of the decoder 131 in the busy check circuit 112, BANK-REQ k from C denotes the output signal of the decoder 131 in the busy check circuit 113, BANK-REQ k from D denotes the output signal of the decoder 131 in the busy check circuit 114, where k is 0, 1, ... 127 as shown in FIG. 9, BANK-REQ k from CPU denotes a signal which indicates whether or not an address requested from the scalar unit (CPU) is in the bank k, and BANK-REQ k from IOP denotes a signal which indicates whether or not an address requested from the input and output processor (IOP) is in the bank k, both signals BANK-REQ k from CPU and BANK-REQ k from IOP each can be generated by a decoder (not shown).

The AND circuit 140 outputs a high level when both the above-mentioned signal BANK-REQ 0 from A and the aforementioned output VU-PRIORITY-OK-A of the second priority control portion 120 are active; the AND circuit 141 outputs a high level when both the above-mentioned signal BANK-REQ 0 from B and the aforementioned output VU-PRIORITY-OK-B of the second priority control portion 120 are active; the AND circuit 142 outputs a high level when both the above-mentioned signal BANK-REQ 0 from C and the aforementioned output VU-PRIORITY-OK-C of the second priority control portion 120 are active; the AND circuit 143 outputs a high level when both the above-mentioned signal BANK-REQ 0 from D and the aforementioned output VU-PRIORITY-OK-D of the second priority control portion 120 are active; the AND circuit 144 outputs a high level when both the above-mentioned signal BANK-REQ 0 from CPU and the aforementioned output PRIORITY-OK-CPU of the second priority control portion 120 are active; and the AND circuit 145 outputs a high level when both the above-mentioned signal BANK-REQ 0 from IOP and the aforementioned output PRIORITY-OK-IOP of the second priority control portion 120 are active.

The outputs of all the above AND circuits 140 to 145 are applied to an OR circuit 152. The output of the OR circuit 152 indicates whether or not a request for access to the bank 0 is requested by at least one of the vector processing units 43 and 44, the scalar unit (CPU), and the input and output processor (IOP), and the request is determined allowable by the first and second priority control portions 119 and 120, i.e., the bank 0 is accessed. The output of the OR circuit 152 is applied to the set terminal of the aforementioned RS-type flip-flop circuit 122 corresponding to the bank 0.

For the other banks 1 to 127, constructions each comprised of six AND circuits and an OR circuit similar to the above construction for the bank 0, and the outputs of the OR circuits are each applied to the set terminals of the aforementioned RS-type flip-flop circuits 123 to 124 corresponding to the banks 1 to 127, respectively.

FIG. 11 shows a detailed construction for the delay circuits 101 and 101' and the related construction in the priority control portions 72 and 72' in the construction of FIGS. 5 and 6.

In FIG. 11, reference numerals 160 to 165 each denote a gate circuit, 166 to 171 each denote a shift register, 172 to 177 each denote a decoder, and 178 to 180 each denote an OR circuit.

The shift registers 166 to 171 are provided corresponding to the aforementioned requests RQA, RQB, RQC, RQD, and the requests from the scalar unit (CPU), and the input and output processor (IOP), respectively, and each of the shift registers 166 to 171 inputs a corresponding address in the above requests RQA, RQB, RQC, RQD, and the requests from the CPU, and the IOP through the corresponding gate circuit 160, 161, 162, 163, 164, or 165. The gate circuits 160 to 165 are each controlled by the aforementioned signals VU-PRIORITY-OK-A, VU-PRIORITY-OK-B, VU-PRIORITY-OK-C, VU-PRIORITY-OK-D, PRIORITY-OK-CPU, and PRIORITY-OK-IOP from the second priority control portion 120, respectively. Namely, only when a corresponding request is determined as allowed in the second priority control portion 120, is the above address input into the corresponding shift register.

In each cycle, the addresses input into the shift registers 166 to 171 are each shifted from one stage to a next stage, and the shift registers 166 to 171 each output the above address at the first and second stages. The outputs at the first stage, each having been delayed by a first predetermined time through the corresponding shift register, are each input into a corresponding one of the decoders 172 to 177. Each of the decoders 172 to 177 functions the same as the decoder 131 in FIG. 9, i.e., each decoder has 128 outputs corresponding to the 128 banks in the main storage units 43 and 44, and each of the outputs indicates whether or not the address input into the decoder is in the bank.

The outputs of the decoders 166 to 171 corresponding to each bank are input into a corresponding one of the OR circuits 178 to 180, and the outputs of the OR circuits 178 to 180 are each applied to a reset terminal of the corresponding one of the RS-type flip-flop circuits 122 to 124 in FIG. 7. Thus, each of the RS-type flip-flop circuits 122 to 124 in FIG. 7 is reset a first predetermined time after its setting.

The outputs at the second stage, each having been delayed by a second predetermined time through the corresponding shift register, are supplied to the selector and buffer control circuit 77 in FIG. 5 for giving timings to the selector & buffer circuit 73 for controlling input and output operations and select operations of the corresponding data in the selector & buffer circuit 73, which data has been read out from the above address in the main storage units 43 and 44.

After the above-mentioned operations of the priority control, data DATA A and DATA B read out from the main storage units 43 and 44 for the request RQA and RQB are input into the selector & buffer circuit 73. The selector & buffer circuit 73 comprises a matrix circuit 79, a buffer circuit 78, and the selector & buffer control circuit 77. The matrix circuit 79 is provided for changing the routes of data which are input into the circuit 79 through two paths from the main storage units 43 and 44, and are output to two banks of the vector register 74 through the buffer circuit 78.

The buffer circuit 78 is provided for adjusting the input timing of the above data into the banks of the vector register 74 under the control of the above selector & buffer control circuit 77.

Although the above explanation was made only for the construction of FIG. 5 showing the vector processing unit 41 for carrying out vector processing for the (4m) - th and (4m+1) -th elements, in the construction of FIG. 6, the vector processing unit 42 for carrying out vector processing for the (4m+2) -th and (4m+3) -th elements, is similar to the above construction of FIG. 5, except that the vector processing unit 42 outputs access signals for the (4m+2) -th and (4m+3) -th elements only, and receives the corresponding data of the (4m+2) -th and (4m+3) -th elements. Correspondingly, the priority control circuit 100' in the construction of FIG. 8, outputs access signals for the (4m+2) -th and (4m+3) -th elements only.

The operation in an indirect addressing mode is basically the same as the operation in the first embodiment of the present invention.

Namely, the indirect addressing controllers 75 and 75' each control reading operations of the address data in the vector register 74 or 74' in its own vector processing unit 23 or 24, and control the supply of the address data from the vector register 74 or 74' to both the vector processing units 41 and 42, when an indirect addressing mode is instructed from the vector processing controller 40.

The address generator 71 or 71' in each vector processing unit 41 or 42 generates effective addresses for vector processing of all the elements using the above address data supplied from the vector registers 74 and 74' in both the vector processing units 41 and 42, when the indirect addressing mode is instructed from the vector processing controller 40.

Namely, when an indirect addressing is instructed from the vector processing controller 40, address data for the indirect addressing for the (4m) -th and (4m+1) -th elements is read out from the main storage units 43 and 44 by the vector processing unit 41, and is temporarily held in a vector register 74 in the vector processing unit 41. On the other hand, address data for the indirect addressing for the (4m+2) -th and (4m+3) -th elements is read out from the main storage units 43 and 44 by the vector processing unit 42, and is temporarily held in a vector register 74' in the vector processing unit 42. Then, the address data held in the vector register in each vector processing unit, is supplied to the address generators 71 and 71' in both the vector processing units 41 and 42, e.g., to register 81, 85, 89, and 93 in the address generator 71, and to the registers 81', 85', 89', and 93' in the address generator 71'.

Thus, according to the present invention, all addresses requested regarding access to the main storage units are generated, and priority controlled, in each memory accessing (for vector processing) unit, even in an indirect addressing mode.

We claim:

1. A system for accessing a region of a memory at which elements of vector data are stored, comprising:
   a plurality of memory access units, each for accessing a predetermined portion of said elements of vector data, and each of said plurality of memory access units further comprising:
   address generating means for receiving information used to generate addresses of the elements of the vector data for all of the plurality of memory access units and based on the received information for generating said addresses of the elements of the vector data for all of the plurality of memory access units;
   priority control means for receiving said addresses, for all of the plurality of memory access units, from said address generating means in each of said plurality of memory access units, and selecting an access to an address, from among said addresses for all of the plurality of memory access units, as allowable based on a predetermined order of the elements of vector data; and
   memory access signal outputting means for outputting a memory access signal including said address, for which said access is selected as allowable by said priority control means, to said memory.

2. A memory access system according to claim 1, wherein said priority control means further comprises:
   previous access time memorizing means for indicating a memory busy state for a predetermined duration of time after a time that a previous access is selected as allowable; and
   means for selecting said access as allowable only when said previous access time memorizing means does not indicate said memory busy state.

3. A memory access system according to claim 1, wherein said priority control means further comprises:
   a plurality of previous access time memorizing means, provided for each of a plurality of ranges of the addresses of the elements, for indicating a memory busy state of the corresponding range for a predetermined duration of time after a time that a previous access for an address in the corresponding range is selected as allowable;
   means for selecting an acess for an address, among said addresses for all of the plurality of memory access units, as an allowable candidate, based on a predetermined order of the elements of the vector data,
   address range determining means for determining to which of said plurality of ranges said addresss, selected as the allowable candidate, belongs; and
   means for selecting said access as allowable only when said previous access item memorizing means, corresponding to the range determined by said address range determining means, does not indicate said memory busy state.

4. A memory access system according to claim 1, wherein said priority control means further comprises:
   last-allowed element indicating means for indicating an element to which the memory access signal are last output; and
   means for selecting a next allowable access based on the indication of said last-allowed element indicating means.

5. A memory access system according to claim 1, further comprising:
   information supplying means for receiving a vector instruction including said information, and simultaneously supplying the information to said plurality of address generating means.

6. A system according to claim 1, wherein:
   said memory comprises a plurality of portions which are concurrently accessible by said plurality of memory access units; and
   said priority control means selects at most one access as allowable, from among said accesses for addresses which are requested by its own memory access unit for each said portion of said memory, based on said addresses concurrently generated in said address generating means of said plurality of memory access units, and said predetermined order of the elements, and then outputs one or more signals of the access which is, selected as allowable, to said memory.

7. A system according to claim 6, wherein said priority control means further comprises:
   a plurality of flag registers for holding corresponding busy status indications of respective portions of said memory; and
   means for setting one or more corresponding flag registers when selecting one or more accesses as allowable, and means for resetting each flag register after a first predetermined time after setting thereof has elapsed.

8. A system according to claim 7, wherein each of said memory access units further comprise:
   a decoder;
   a delay circuit for inputting when setting any one of said flag registers, the address generated in said priority control means corresponding to the set flag register, and outputting said address to said decoder after said first predetermined time; and
   said decoder decoding said output of said delay circuit and applying the decoded results as reset signals to said resetting means for resetting said plurality of flag registers.

9. A system according to claim 1, wherein each of said memory access units further comprise:
   a vector register for temporarily holding data, which is transferred from a data buffer circuit in the memory access unit, until the data is read out for a vector calculation;
   said data buffer circuit temporarily holding said data, which is read out from the memory, before inputting the data into said vector register; and
   a delay circuit for inputting, when an access among said accesses requested by its own memory access unit is selected as allowable, the address output by said memory access signal outputting means and for outputting said address to said data buffer circuit for controlling timing of said input of the data into said vector register, a second predetermined time after the input of said address.

10. A system according to claim 1, further including a central processing unit and an input/output processor, each producing access requests, wherein:
said priority control means selects one or more accesses as allowable, from among accesses for addresses which are requested by its own memory access unit, an access requested by said central processing unit, and an access requested by said input/output processor, based on said addresses concurrently generated in said address generating means of said plurality of memory access units, and said predetermined order of the elements, and then outputs one or more signals of the access which to selected as allowable, to said memory.

11. A system according to claim 10, wherein:
said memory comprises a plurality of portions which are concurrently accessible from said plurality of memory access units, said central processing unit and said input/output processor; and
said priority control means selects at most one access as allowable, from among accesses for addresses which are requested by its own memory access unit, an access requested by said central processing unit and an access requested by said input/output processor, for each portion of said memory, based on said addresses concurrently generated in said address generating means of said plurality of memory access units, said predetermined order of the elements, an address in said access requested by said central processing unit and an address in said access requested by said input/output processor, and then outputs one or more signals of the access which is selected as allowable, to said memory.

12. A system according to claim 11, wherein said priority control means further comprises:
a plurality of flag registers for holding corresponding busy status indications of respective portions of said memory; and
means for setting one or more corresponding flag registers when selecting one or more accesses as allowable, and means for resetting each flag register after a first predetermined time after setting thereof has elapsed.

13. A system according to claim 12, wherein each of said memory access units further comprise:
a decoder
a delay circuit for inputting, when setting any one of said flag registers, the address generated in said priority control means corresponding to the set flag register and for outputting said address to said decoder after said first predetermined time has elapsed; and
said decoder decoding said output of said delay circuit and applying the decoded results as reset signals to said resetting means for resetting said plurality of flag registers.

14. A system according to claim 10, wherein each of said memory access units further comprise:
a vector register for temporarily holding data, which is transferred from a data buffer circuit in the memory access unit, until the data is read out for a vector calculation;
said data buffer circuit temporarily holding said data, which is read out from the memory, before inputting the data into said vector register; and
a delay circuit for inputting, when an access among said accesses requested by its own memory access unit is selected as allowable, the address output by said memory access signal outputting means, and for outputting said address to said data buffer circuit for controlling timing of said input of the data into said vector register, a second predetermined time after the input of said address.

15. A system according to claim 1, further including a memory access controller generating an indirect addressing mode instruction, wherein each of said memory access units further comprise:
a vector register for temporarily holding indirect address data for an indirect addressing of said portion of elements assigned to the memory access unit, where said address data has been read out from said memory, and for supplying the indirect address data for generating effective addresses of the indirect addressing for all the elements of the vector data in said address generating means in all of said plurality of memory access units; and
an indirect addressing controller for controlling reading operations of said indirect address data in said vector register, and for controlling the supply of the indirect address data to all of said plurality of memory access units, when an indirect addressing mode is generated by said memory access controller;
said address generating means generating said effective addresses for accessing all the elements using said indirect address data supplied from said vector register in all of the plurality of memory access units, when said indirect addressing mode is generated by said memory access controller.

16. A system, according to claim 15, wherein:
said memory comprises a plurality of portions which are concurrently accessible from said plurality of memory access units; and
said priority control means selects one access as allowable, from among accesses for addresses which are request by it own memory access unit, for each portion of said memory, based on said addresses concurrently generated in said address generating means of said plurality of memory access units, and said predetermined order of the elements, and then outputs one or more signals of the access which is selected as allowable, to said memory.

17. A memory, according to claim 16, wherein said priority control means further comprises:
a plurality of flag registers for holding corresponding busy status indications of respective portions of said memory; and
means for setting one or more corresponding flag registers when selecting one or more accesses as allowable, and means for resetting each flag register after a first predetermined time after setting thereof has elapsed.

18. A memory access system, according to claim 17, wherein each of said memory access units further comprise:
a decoder;
a delay circuit for inputting, when setting any one of said flag registers, the address generated in said priority control means corresponding to the set flag register and for outputting said address to said decoder after said first predetermined time has elapsed; and said decoder decoding said output of said delay circuit and applying the decoded results as reset signals to said resetting means for resetting said plurality of flag registers.

19. A memory access system, according to claim 15, wherein:
said vector register in each of said memory access units temporarily holds data which is read out from the memory, as well as said indirect address data, until the data is read out for a vector calculation; and
each of said memory access units further comprising
a data buffer circuit for inputting the data into said vector register; and
a delay circuit for inputting, when an access among said accesses requested by its own memory access unit is selected as allowable, the address generated by said priority control means, and outputting said address to said data buffer circuit for controlling timing of said input of the data into said vector register, a second predetermined time after the input of said address.

20. A memory access system, according to claim 15, further including a central processing unit and an input/output processor, each producing access requests, wherein:
said priority control means selects one or more accesses as allowable, from among said accesses for addresses which are requested by its own memory access unit, an access requested by said central processing unit and an access requested by said input/output processor, based on said addresses concurrently generated in said address generating means of said purality of memory access units, and said predetermined order of the elements, and then outputs one or more signals of the access which is selected as allowable, to said memory.

21. A memory access system, according to claim 20, wherein:
said memory comprises a plurality of portions which are concurrently accessible from said plurality of memory access units, said central processing unit and said input/output processor; and
said priority control means selects at most one access as allowable, from among accesses for addresses which are requested by its own memory access unit, an access requested by said central processing unit and an access requested by said input/output processor, for each said portion of said memory, based on said addresses concurrently generated in said address generating means of said plurality of memory access units, said order of the elements, an address in said access requested by the central processing unit and an address in said access requested by the input/output processor, and then outputs one or more signals of the access which is selected as allowable, to said memory.

22. A memory access system according to claim 21, wherein said priority control means further comprises:
a plurality of flag registers for holding corresponding busy status indications of respective portions of said memory; and
means for setting one or more corresponding flag registers when selecting one or more accesses as allowable and means for resetting each flag register after a first predetermined time after setting thereof has elapsed.

23. A memory access system, according to claim 21, wherein each of said memory access units further comprise:
a decoder;
a delay circuit for inputting, when setting any one of said flag registers, the address generated in said priority control means corresponding to the set flag register and outputting said address to said decoder after said first predetermined time has elapsed; and
said decoder decoding said output of said delay circuit and applying the decoded results as reset signals to said resetting means for resetting said plurality of flag registers.

24. A memory access system, according to claim 20, wherein:
said vector register in each of said vector processing units temporarily holds data, which is transferred from a data buffer circuit in the memory access unit, until the data is read out for a vector calculation; and
each of said memory access units further comprises:
a data buffer circuit for temporarily holding said data, which is read out from the memory, before inputting the data into said vector register; and
a delay circuit for inputting, when an access among said accesses requested by its own memory access unit is selected as allowable, the address output by said memory access signal outputting means and for outputting said address to said data buffer circuit for controlling timing of said input of the data into said vector register, a second predetermined time after the input of said address.

* * * * *

UNITED STATES PATENT AND TRADEMARK OFFICE
CERTIFICATE OF CORRECTION

PATENT NO. : 5,276,902
DATED : January 4, 1994
INVENTOR(S) : NAKATANI et al.

It is certified that error appears in the above-indentified patent and that said Letters Patent is hereby corrected as shown below:

Title page   [75] Inventors: after third inventor's name, change "Kunitachi" to --Tokyo--;

[56] References Cited, U.S. Patent Documents, U.S. classifications for each of the seven U.S. Patents should be --364/200--.

Col. 1,   line 44, change "request" to --requests--.

Col. 5,   line 58, before "half" insert --a respective, corresponding--.

Col. 7,   line 43, change "receives" to --receive--;
line 51, change "above discussed" to --above-discussed--.

Col. 8,   line 9, change "indirected" to --indirect--.

Col. 9,   line 48, after "circuit" insert --("I/O")--;
line 49, delete "("I/O")".

Col. 10,   line 21, change "MSVA ... MSVD" to --MSUA ... MSUD--.

Col. 11,   line 14, change " $\overline{BUSY}\ i$ " to -- $\overline{BUSY\ i}$ --;

line 17, change " $\overline{BUSY}\ i$ " to -- $\overline{BUSY\ i}$ --.

Col. 15,   line 58, change "acess" to --access--;
line 64, change "addresss" to --address--.

UNITED STATES PATENT AND TRADEMARK OFFICE
CERTIFICATE OF CORRECTION

PATENT NO. : 5,276,902
DATED : January 4, 1994
INVENTOR(S) : NAKATANI et al.

It is certified that error appears in the above-indentified patent and that said Letters Patent is hereby corrected as shown below:

Col. 16, line 6, change "are" to --is--;
line 29, after "is" delete ",";
line 43, change "comprise" to --comprises--;
line 49, after "time" insert --has elapsed--;
line 55, change "comprise" to --comprises--.

Col. 17, line 15, change "to" to --is--;
line 47, change "comprise" to --comprises--;
line 61, change "comprise" to --comprises--.

Col. 18, line 12, change "comprise" to --comprises--;
line 42, change "request by it" to --requested by its--;
line 56, begin a new paragraph with "means for...";
line 61, change "prise" to --prises--.

Col. 20, line 17, change "21" to --22--;
line 19, change "comprise" to --comprises--.

Signed and Sealed this

Twenty-eight Day of February, 1995

Attest:

BRUCE LEHMAN

*Attesting Officer*     *Commissioner of Patents and Trademarks*